A. CASE.

Stereotype Plate-Holder.

No. 6,325.

Reissued March 9, 1875.

WITNESSES:

Chas. H. Carpenter

N. Walter Anthony

INVENTOR:

Ariel Case

R. Hoe & Co. Assignees:

UNITED STATES PATENT OFFICE.

ARIEL CASE, OF NEW HAVEN, CONNECTICUT, ASSIGNOR TO R. HOE & CO., OF NEW YORK CITY.

IMPROVEMENT IN STEREOTYPE-PLATE HOLDERS.

Specification forming part of Letters Patent No. 54,110, dated April 24, 1866; reissue No. 6,325, dated March 9, 1875; application filed February 25, 1875.

*To all whom it may concern:*

Figure 1:
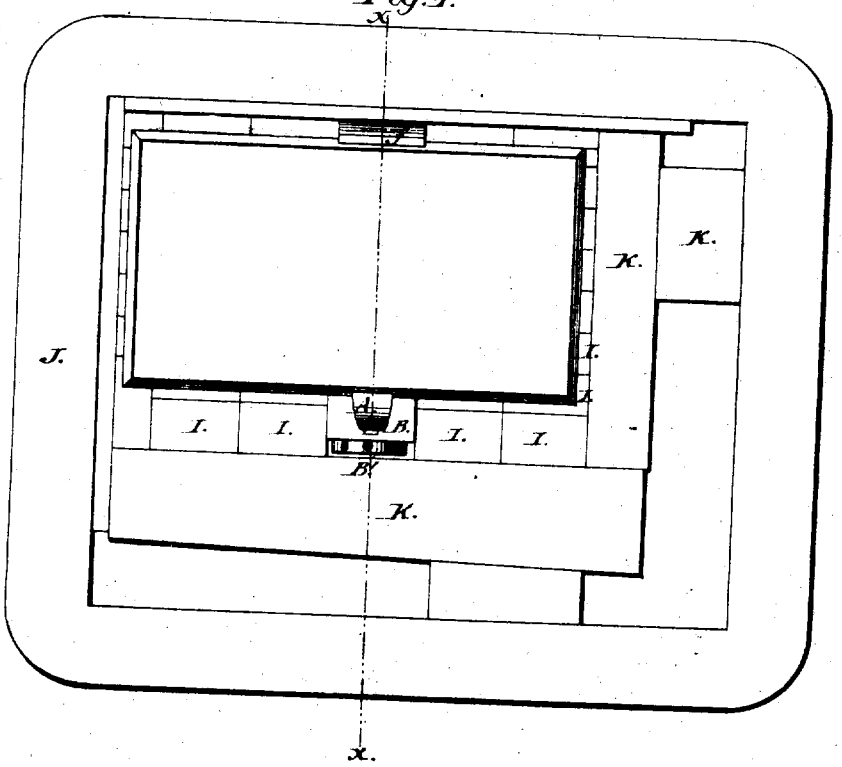
Figure 2:
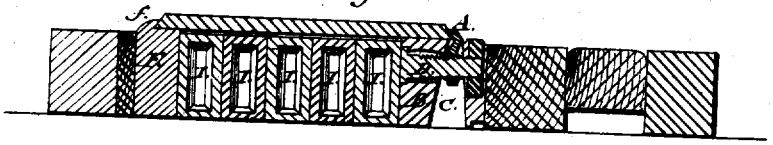
Figure 3:
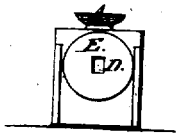

Be it known that ARIEL CASE, of New Haven, Connecticut, did invent certain Improvements in Stereotype-Plate Holders, of which the following is a specification:

In the accompanying drawings, in which like letters refer to like parts, Figure 1 is a top view of the block with a plate secured thereto, and the said parts securely locked in a chase ready for use. Fig. 2 is a sectional view of the same on line *x x* of Fig. 1; and Fig. 3 is a detached end view of the lock.

The invention relates to the construction of the blocks upon which stereotype-plates are supported for printing therefrom, and to the means of securing stereotype-plates upon their supporting-beds.

Heretofore stereotype-plate supporting-blocks have been made of a size nearly equal to that of the plate to be supported, which blocks are supplied with a locking device, forming an integral part thereof, and extending beyond its edges on opposite sides, being provided at one end with a jaw, to engage with the plate, and at the other end with a means for actuating said jaw, so as to cause it to clamp the plate between itself and a fixed jaw or lip at the opposite side of the block. This construction necessitated a large number of different sizes of blocks in every printing-office, which involved a considerable expense both of material and storage-room. This objection was in a large measure overcome by setting up from the metal quadrats a supporting-form equal to the surface area of the plate, and providing, at suitable points along its sides, brass plates, terminating in lips at their upper edges, which plates, when adjusted in a vertical position against the "form" of quadrats, so that their lips overhang the edges of the plate, the whole can be locked up together in a chase by the well-known wedging process. But while this overcomes to some extent the disadvantage of having to use separate and arbitrary sized blocks to hold the plates, it was found equally objectionable to be required to unlock the form whenever it became necessary to remove or change the plate; and, moreover, it was necessary to use the utmost care, and to make nice and exact adjustment of the quadrats, by inserting leads and scaleboard strips between them, in order that when secured tightly together in the chase, under the pressure of the locking-wedges, the jaws or lips would properly grasp the plate without their being bent, and the form be so held in the chase as to be capable of being lifted from the imposing-table to the press. Discarding such a device, therefore, as impracticable, its useful feature has been preserved by forming the "block" from quadrats, setting them up together, with one or more pairs of jaw-carrying pieces, one of each pair of such pieces having its jaw independently adjusted in its supporting base, whereby the plate-supporting block may be made up without regard to that nice adjustment rendered necessary when rigid plate-clamping jaws are used, any slight variation in the relative sizes of the block and plate being compensated for by the adjustable jaw. And when thus made up and locked in a chase, this plate-holder is adapted to release the plate by a suitable movement of the adjustable jaw, so that the plate it holds may be readily removed or exchanged for another of a size approximating to it, without unlocking the chase. This constitutes one feature of the invention. Another feature consists in providing the shank of the adjustable jaw with a screw-threaded opening or nut, whereby it is adapted to travel upon the screw-thread of its actuating screw-bolt, which may thus be seated in proper bearings in the supporting-block, so as to simply rotate therein.

The construction and operation of these improvements will now be described.

A block of metal, B, has a vertical mortise in its body, into which the shank of the hook A extends, as seen in Fig. 2, and which provides for its lateral movement or play. In suitable bearings, bored transversely through the block, a screw-bolt, D, is seated, being so confined by a head upon one end and a collar, E, upon the other, that its longitudinal movement is prevented, while its free rotation is provided for. The threads upon this bolt exactly conform to those in the shank of the hook A, which travels upon them. The collar E is fixed upon the squared end of the bolt D, and is provided upon its periphery with sockets, into which the end of a suitable tool may be inserted to cause its rotation. When thus rotated, it will cause the hook or jawed arm A to travel, guided by the mortise C, forward and back upon it, as the case may be. A second or auxiliary jawed block, F, is placed on one side of the chase, and the block B is placed on the opposite side of the chase, a distance from the former equal to or wider than the plate to be supported. Between these blocks, and surrounding them, suitable quadrats I are placed, so as to form a supporting-bed of an area equal to or greater than the surface area of the plate to be held. The form or bed thus constructed is securely locked in the chase in the manner common in locking up forms of type, by means of quoins K. The jaws of the blocks B and F will then project above the bed, which is of such a height as to raise the plate, when supported thereon, to the regular or type height. Upon running the jaw A back a suitable distance, the beveled edge of the plate may be placed between it and the jaw *f*, when by rotating the screw-bolt D, the jaw A forces the plate against the jaw *f*, between which latter and the said movable jaw A it is firmly clamped, thus locking it securely to the bed. The chase, supporting-bed, and plate, confined together, may then be carried to and removed from the press.

As many sets of these jawed blocks may be used as is demanded by the size of the plate, and they may be placed at the ends as well as at the sides of the plate, if found necessary.

It is obvious that by seating the actuating screw-bolt D in fixed bearings, and thus providing for its simple rotation, without longitudinal movement, in reciprocating the fastening-jaw, a short bolt may be used which will not bend or become otherwise distorted by reason of the power exerted in forcing the jaws to duty.

What is claimed as the invention of ARIEL CASE is—

1. A stereotype-block, consisting of a number of quadrats, a hooked plate-holding block, F, and the plate-holding block B, carrying an adjustable hook, whereby, when the said furniture is locked in a chase, the stereotype-plate may be detached therefrom, substantially as described, and for the purpose set forth.

2. The stereotype-plate holding-hook and its actuating-nut, constructed substantially as described.

3. The combination of the plate-holding jaw or hook A, having a screw-threaded opening in its shank, with its actuating-screw D seated in bearings in a supporting-block, substantially as described.

R. HOE & CO.

Witnesses:

CHAS. W. CARPENTER,
N. WALTER ANTHONY.